United States Patent [19]

Nakabayashi

[11] 3,770,502

[45] Nov. 6, 1973

[54] SODIUM-SULFUR STORAGE BATTERY

[75] Inventor: Takashi Nakabayashi, Takatsuki, Japan

[73] Assignee: Yuasa Battery Company Limited, Takatsuki, Japan

[22] Filed: Aug. 11, 1972

[21] Appl. No.: 279,813

[52] U.S. Cl............................. 136/6 FS, 136/83 R
[51] Int. Cl. ......................................... H01m 35/00
[58] Field of Search .................. 136/6 F, 6 FS, 6 L, 136/6 LF, 83 R, 20, 3, 153, 86 R

[56] References Cited
UNITED STATES PATENTS

| | | | |
|---|---|---|---|
| 3,413,150 | 11/1968 | Kummer et al.................... | 136/6 FS |
| 3,441,446 | 4/1969 | Heredy.......................... | 136/6 LF X |
| 3,533,848 | 10/1970 | Winn................................ | 136/86 R |

Primary Examiner—Anthony Skapars
Attorney—Watson, Cole, Grindle & Watson

[57] ABSTRACT

A sodium-sulfur storage battery made up of a solid electrolyte on which graphite sheet containing sulfur as a cathodic reactant is wound and is further tightly bound by sulfur-resistant metal, a reservoir connected to the solid electrolyte and sealed at its top, a battery container sealed by the battery cap attached to the reservoir and provided with a mechanism that absorbs stress applied to the upper part of the solid electrolyte, a negative terminal serving as a sodium injecting tube, and a positive terminal attached to the battery container. This sodium-sulfur storage battery has an improved performance and long life.

4 Claims, 3 Drawing Figures

SODIUM-SULFUR STORAGE BATTERY

This invention relates to a storage battery, and, more particularly, to a novel sodium-sulfur storage battery.

The known sodium-sulfur storage battery is made up of sulfur as a cathodic reactant, sodium as an anodic reactant, $\beta$-$Al_2O_3$ as a solid electrolyte, and a container holding these components. Since sulfur lacks electronic conductivity, sulfur has been used in conjunction with carbon powder incorporated therein. This mixture, however, suffers from the defect that electric conductivity between $\beta$-$Al_2O_3$ and the mixture is relatively poor, voltage drop at discharge is great, and discharging at a high current density is impossible to achieve. This battery also suffers from another disadvantage that the sulfur in a molten state while the battery is at work solidifies upon cooling when the battery is brought to rest and this phase transition forces a pressure upon $\beta$-$Al_2O_3$ and breaks it, resulting in a shorter cell life. This invention is intended to eliminate all of these defects.

The primary object of this invention is to provide a high performance sodium-sulfur storage battery.

The second object of this invention is to provide a long life sodium-sulfur storage battery.

The third object of this invention is to provide an easy-to-make low-priced sodium-sulfur storage battery.

Other objects of this invention will be obvious from the following description and accompanying drawings.

Figure 1:
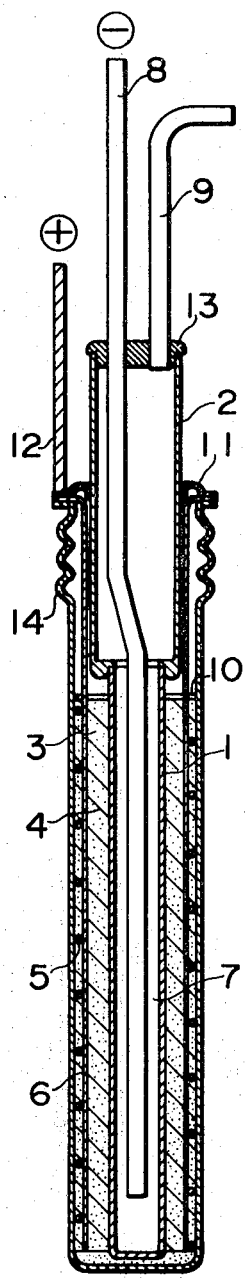
FIG. 1 is a longitudinal cross sectional view of a battery in accordance with this invention.

Referring now to FIG. 1 the solid electrolyte 1 is made of $\beta$-$Al_2O_3$ and formed into a bottomed cylinder, and is a non-porous substance that allows only sodium ions to pass and separates the anode and cathode from each other.

The sodium reservoir 2 formed into a cylinder is made of $\alpha$-$Al_2O_3$. The reservoir 2 and the solid electrolyte 1 are firmly joined to each other by means of solder glass, in such a method that powder composed of $SiO_2$ 52 percent, $B_2O_3$ 30 percent, $Na_2O$ 13 percent, $Al_2O_3$ 3.0 percent, and $CoO$ 2 percent is applied to the adjoining surfaces of the solid electrolyte and reservoir and subsequently they are heated slowly until the solder glass powder melts and kept at 850° C for several minutes, followed by gradual cooling. The joint thus obtained is very strong and there is no liability to deteriorate the performance of the battery because the welding temperature does not permit transition of $\beta$-$Al_2O_3$ of solid electrolyte separator to $\alpha$-$Al_2O_3$.

The cathodic reactant 3 is sulfur or sodium polysulfide, and it is used in a molten state at about 300° C – 350° C. Since sulfur lacks electric conductivity, it is used in conjunction with a graphite sheet 4 of porous graphite or graphite felt, which acts as an electrode matrix for the sulfur cathode, wound on the solid electrolyte. The graphite sheet is bound tight by a net, strip, or wire of sulfur-resistant metal 5 such as stainless steel. In order to protect the graphite sheet 4 from being damaged by too tight binding, several stainless steel strips 6 are arranged on the graphite sheet 4 in the longitudinal direction, when necessary. As mentioned above, such a structure is an important feature of the invention that provides a good electric conductivity between the solid electrolyte 1 and the graphite sheet 4, with the result that sulfur is effectively used, voltage drop during discharge is reduced, and discharging at a high current density is made possible. The anodic reactant 7 is molten sodium at about 300° C – 350° C encased in the solid electrolyte 1 and the reservoir 2. The sodium injecting tube 8 serves as a negative terminal, too. A long charging terminal and short discharging terminal can be provided with the negative terminal, if necessary, so that the lower end of the discharging terminal separates from sodium and consequently discharging is suspended automatically, as sodium decreases during discharging. This provides an advantage that over-discharge can be prevented. The exhaust pipe 9 facilitates injecting sodium into the solid electrolyte 1 and reservoir 2 through the sodium injecting tube 8 serving as the negative terminal. The battery container 10 is made of such a material as stainless steel which has sufficient resistance to molten sulfur or sodium polysulfide at high temperatures. At the upper end of the battery container 10 the extended parts of the stainless steel strips 6 and the battery cap 11 attached to the reservoir 2 are hermetically sealed by welding. The battery cap 11 is made of a cobalt-iron-nickel alloy which has a coefficient of thermal expansion close to that of $\alpha$-$Al_2O_3$ of the reservoir 2 to keep better imperviousness. The battery cap 11 is provided with the positive terminal 12. The top of the reservoir 2 is sealed by the cover plate 13 made of ceramics or glass. The bellows 14 provided on the upper part of the battery container is another important feature of the invention.

In the sodium-sulfur storage battery according to the invention sulfur of cathode and sodium of anode in a molten state at about 300° C – 350° C perform electromotive reactions as following equations.

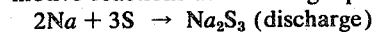
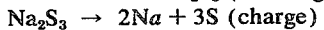

$2Na + 3S \rightarrow Na_2S_3$ (discharge)

$Na_2S_3 \rightarrow 2Na + 3S$ (charge)

During discharge, sodium of anode is ionized and passes through the solid electrolyte, reaching the cathode, where sodium polysulfide is formed. This reaction generates electric energy, and an energy density of about 780 Wh/kg is obtained.

When sulfur of cathode undergoes phase transition from liquid to solid, stress is applied to the solid electrolyte 1, and as a result the solid electrolyte 1 is damaged and the life of battery is reduced. This stress concentrates in the vicinity of the joint between the solid electrolyte 1 and the reservoir 2. In the battery according to this invention, a structure that absorbs this stress caused by sulfur of cathode is provided to the battery container, and more particularly, to a part of the battery container which is not in contact with sulfur as a cathodic reactant, in order to increase the battery life. This structure is the bellows 14 provided to the upper part of the battery container 10. The bellows 14 may be formed on the battery container by the known press forming, or may be formed separately and subsequently welded to the battery container. Thus, the solid electrolyte 1 is protected from damage, because stress applied to it is absorbed by the bellows, and as a result the battery life is considerably increased.

Figure 2:
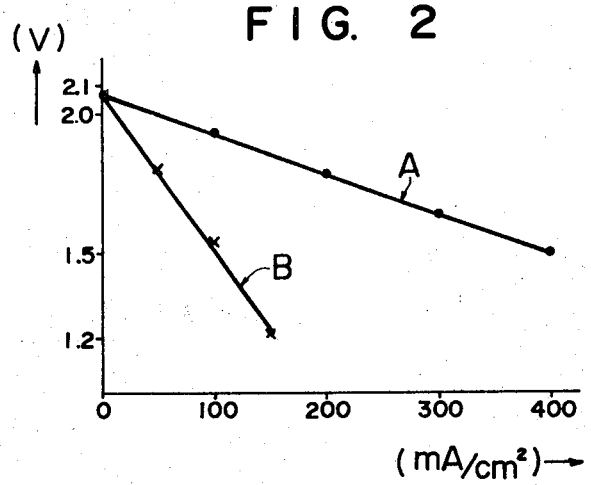
FIG. 2 is a graph comparing the performance of a conventional battery with that of a battery according to this invention.

FIG. 2 shows the discharge current density terminal voltage characteristic curves of two batteries, the discharging terminal voltage as ordinate and the discharging current density as abscissa. Curve A is the current-voltage characteristic curve for the battery according to the invention, which gives terminal voltages of 1.94V, 1.795V, 1.64V, and 1.505V for current densities of 100, 200, 300, and 400 mA/cm$^2$, respectively. On the other hand, curve B is the current-voltage characteristic curve for a battery with a sulfur electrode in which sulfur and graphite powder are blended at a ratio that gives the best conductivity. It gives terminal voltages of 1.80V and 1.53V for current densities of 50 mA/cm$^2$ and 100 mA/cm$^2$, respectively. It will be obvious from the comparison of curves A and B that the battery according to the invention is superior to the conventional battery.

Figure 3:
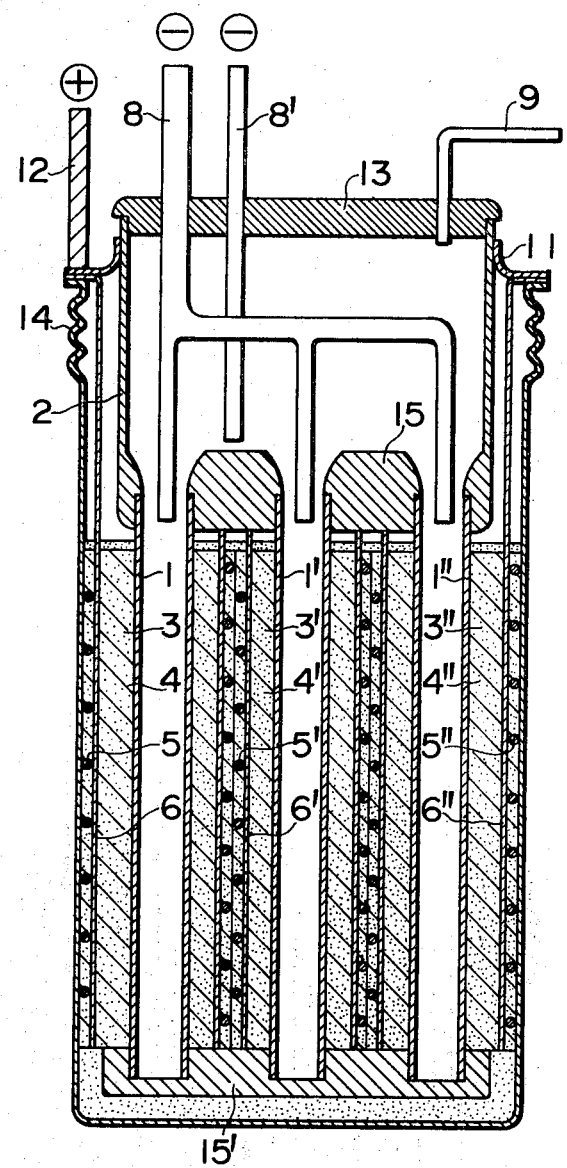
FIG. 3 is a longitudinal cross sectional view of another battery in accordance with this invention, which is provided with a plurality of solid electrolytes.

FIG. 3 shows another sulfur-sodium storage battery in according to this invention, which is of a structure suitable for obtaining high output. The battery of this structure is made up of three solid electrolytes indicated by reference numbers 1, 1', and 1''. These solid electrolytes 1, 1', and 1'' are held in holes provided on the upper frame 15 and lower frame 15' made of $\alpha$-Al$_2$O$_3$ of cobalt-iron-nickel alloy, and are formed into a single block.

$\beta$-Al$_2$O$_3$ solid electrolyte is mechanically weak and consequently it is often vulnerable. Therefore, a solid electrolyte of large size for high electric power is infeasible because of its vulnerability. However, the battery that has plural solid electrolytes, practically 10 – 20 mm diameter, can be applied for high electric power source for the reason of high mechanical strength and extended surface area.

Incidentally, the battery as shown in FIG. 3 is of about the same structure as that shown in FIG. 1; for instance, the solid electrolytes 1, 1', and 1'' are enclosed by the graphite sheets 4, 4', and 4'', respectively, and further reinforced with stainless steel strips 6, 6', and 6'' and then tightly bound by the sulfur-resistant metal 5, 5', and 5''.

Slightly different points are as follows: The battery as shown in FIG. 3 employs a plurality of negative terminals. The charging terminal 8 serving as a sodium injecting tube is branched in the middle and connected to the respective solid electrolytes 1, 1' and 1''. The discharging terminal 8' is relatively short.

While the invention is illustrated and described in its presently preferred embodiment, it will be understood that modification and variations may be effected without departing from the scope of the novel concepts of this invention and as set forth in the appended claims. For instance, it is possible to provide the bellows on the battery cap instead of the upper part of the battery container.

What is claimed is:

1. A sodium-sulfur storage battery comprising a solid electrolyte on which graphite sheet containing sulfur as a cathodic reactant is wound and said graphite sheet is further tightly bound by sulfur-resistant metal and in which sodium as an anodic reactant is held, a reservoir sealed at its top and joined to said solid electrolyte, a battery container sealed with a battery cap at its top and holding said solid electrolyte, and reservoir, a negative terminal serving as a sodium injecting tube, and a positive terminal attached to said battery container.

2. The sodium-sulfur storage battery as claimed in claim 1, wherein the solid electrolyte and reservoir are joined with solder glass.

3. The sodium-sulfur storage battery as claimed in claim 1, wherein a plurality of negative terminals consisting of short discharging terminal and long charging terminal are provided.

4. The sodium-sulfur storage battery as claimed in claim 1, wherein bellows are provided to the battery container in order to absorb stress applied to the solid electrolyte joined to the reservoir.

* * * * *